US010552615B2

United States Patent
Cornell et al.

(10) Patent No.: US 10,552,615 B2
(45) Date of Patent: Feb. 4, 2020

(54) THREAT RESPONSE SYSTEMS AND METHODS

(71) Applicant: SWIMLANE LLC, Tempe, AZ (US)

(72) Inventors: Cody Cornell, Boulder, CO (US); Brian Kafenbaum, Anthem, AZ (US); Brant Wheeler, Cookeville, TN (US); Austin McDaniel, Boynton Beach, FL (US)

(73) Assignee: Swimlane LLC, Louisville, CO (US)

( * ) Notice: Subject to any disclaimer, the term of this patent is extended or adjusted under 35 U.S.C. 154(b) by 6 days.

(21) Appl. No.: 15/047,391

(22) Filed: Feb. 18, 2016

(65) Prior Publication Data
US 2017/0243008 A1    Aug. 24, 2017

(51) Int. Cl.
*H04L 29/06*    (2006.01)
*G06F 21/57*    (2013.01)
*G06Q 10/06*    (2012.01)

(52) U.S. Cl.
CPC ....... *G06F 21/577* (2013.01); *G06Q 10/0633* (2013.01)

(58) Field of Classification Search
CPC . H04L 63/14; H04L 63/1408; H04L 63/1433; H04L 63/1441; G06F 21/55; G06F 21/577; G06Q 10/0633; G06Q 10/0635
See application file for complete search history.

(56) References Cited

U.S. PATENT DOCUMENTS

| 5,557,742 | A  | 9/1996  | Smaha et al.    |
|-----------|----|---------|-----------------|
| 6,275,942 | B1 | 8/2001  | Bernhard et al. |
| 7,134,141 | B2 | 11/2006 | Crosbie et al.  |

(Continued)

FOREIGN PATENT DOCUMENTS

| WO | 200125935  | 4/2001 |
|----|------------|--------|
| WO | 2015-051181 | 4/2015 |

OTHER PUBLICATIONS

Swimlane press release, "No Security Alert Left Behind: Swimlane Launches Automated Security Operations Management Platform," http://swimlane.com/news/swimlane-no-security-alert-left-behind/, Jan. 21, 2015.

(Continued)

*Primary Examiner* — Yogesh Paliwal
(74) *Attorney, Agent, or Firm* — Snell & Wilmer, L.L.P.

(57) ABSTRACT

A security operations system may receive an alarm in response to a detected threat. The alarm may include characteristics of the threat. The system may then generate a record in response to the alarm and populate a form with the characteristics of the threat. The form may be associated with the record and selected in response to a type of the threat. The system may further generate a workflow including at least one but potentially multiple actions. The system also receives security contextual information in response to a request including the characteristics of the threat or associated indicators of the threat and then updates the form to include the security contextual information. The security operations system can evaluate contextual information and request additional information, as well as leverage workflow to take iterative changes to rulesets and configurations, to provide additional security protection or garner additional information on a threat.

20 Claims, 7 Drawing Sheets

(56) References Cited

U.S. PATENT DOCUMENTS

| | | | |
|---|---|---|---|
| 7,200,616 | B2 | 4/2007 | Takeuchi et al. |
| 7,260,844 | B1 | 8/2007 | Tidwell et al. |
| 7,418,733 | B2 | 8/2008 | Conary et al. |
| 7,644,365 | B2 | 1/2010 | Bhattachaiya et al. |
| 7,895,641 | B2 | 2/2011 | Schneier et al. |
| 7,941,854 | B2 | 5/2011 | Baffes et al. |
| 8,225,407 | B1 | 7/2012 | Thrower et al. |
| 8,314,683 | B2 | 11/2012 | Pfeffer |
| 8,539,546 | B2 | 9/2013 | Kobayashi et al. |
| 8,595,831 | B2 | 11/2013 | Skare |
| 8,850,565 | B2 | 9/2014 | Patrick et al. |
| 9,258,321 | B2 | 2/2016 | Amsler et al. |
| 9,349,001 | B2 | 5/2016 | Gathala et al. |
| 2006/0031938 | A1 | 2/2006 | Choi |
| 2006/0242695 | A1 | 10/2006 | Gold et al. |
| 2007/0061874 | A1 | 3/2007 | Coppola et al. |
| 2007/0107041 | A1 | 5/2007 | Kayashima et al. |
| 2009/0063232 | A1 | 3/2009 | Refsland et al. |
| 2011/0126111 | A1* | 5/2011 | Gill .................. G06F 21/55 715/736 |
| 2014/0201836 | A1 | 7/2014 | Amsler |
| 2014/0214744 | A1 | 7/2014 | Froelich |
| 2014/0278664 | A1* | 9/2014 | Loomis .......... G06Q 10/063118 705/7.17 |
| 2015/0207809 | A1 | 7/2015 | Macaulay |
| 2015/0235164 | A1 | 8/2015 | Key |
| 2015/0242625 | A1 | 8/2015 | Cassidy et al. |
| 2015/0319185 | A1 | 11/2015 | Kirti et al. |
| 2016/0149948 | A1* | 5/2016 | Loomis ............... H04L 63/1441 726/23 |

OTHER PUBLICATIONS

Cheang et al., "State of Cybersecurity and the Roadmap to Secure Cyber Community in Cambodia" Reliability and Security, 2009. ARES'09. International Conference on. IEEE, 2009.

Ahmad et al., "Incident response teams—Challenges in supporting the organizational security function." Computers & Security 31.5 (2012): 643-652.

Kilcrece et al., "Organizational Models for Computer Security Incident Response Teams (CSIRTs)", Software Engineering Institute, CMU/SEI Report No. CMU/SEI-2003-HB-001 (2003).

DFLabs IncMan Overview, "Incident Management Suite," http://www.slideshare.net/mizambo/dflabs-incman-incident-management-suite, 13 pages, Jul. 28, 2015.

Best Practical Solutions, LLC, "RTIR: RT for Incident Response, RTIR vs. RT," 4 pages, https://bestpractical.com/rtir/comparison.html, Jul. 28, 2015.

Harsch, Shane, "Advanced DOC Design Next Generation Security Operations," EMC Corporation, pp. 1-38, 2012.

CO3Systems, Company Overview, "Automated incident Response Cyber intrusion," 2 pages.

Best Practical Solutions, LLC, DFLabs IncMan Suite—Security Incident and Data Breach Management Software, Dec. 27, 2012, YouTube, Jul. 28, 2015, 2 pages, https://www.youtube.com/watch?v=wwSMmcRM9Bc&noredirect=1.

Mucha, Grzegorz, "Introduction to RSA Archer GRC Platform," 29 pages, EMC Forum 2010.

EMC Corporation, RSA Security Incident Management—Enabling Next Generation Security Operations, pp. 1-4, EMC Corporation Copyright 2011.

University Van Tilburg, "Presentation Outline—AIRT Goals and Design Philosophy," 32 pages.

ACM Business Solutions, "The Smart Way to Manage Your Computer Security Incidents," 2 pages.

Imperva Solution Brief, "Technology Alliance: Imperva Integration with BMC Remedy," 2 pages, Imperva, Inc., Copyright 2014.

McRee, Russ, AIRT: "Application for Incident Response Teams," ISSA Journal, Aug. 2009, pp. 39-42.

Leune et al, "Designing and Developing an Application for Incident Response Teams," pp. 1-12, May 9, 2006, Tilburg University, The Netherlands.

Splunk, Inc. "Enterprise Security Suite—Security Information Management, Monitoring and Reporting to Facilitate Situational Awareness," Splunk, Inc. Copyright 2010.

PCT; International Search Report dated May 19, 2017 in PCT/US2017/017363.

PCT; Written Opinion of Search Authority dated May 18, 2017 in PCT/US2017/017363.

\* cited by examiner

| Tracking Id | Location | Alert Type | Alert Date and Time | Alert IP Source | Alert Triage Status | Severity | Alert Destination | Field |
|---|---|---|---|---|---|---|---|---|
| IR-2 | DAL | Data Loss | May 27, 2014 10:12 AM | 10.1.1.21 | In Progress | None | | |
| IR-3 | TSC | Data Loss | May 23, 2014 2:04 AM | 10.1.3.77 | Pending | Low | | |
| IR-4 | OMA,SLC | DDoS | May 8, 2014 12:39 AM | 10.1.1.213 | Pending | None | crm01.acme.com | |
| IR-6 | MIA | Threat Intel | April 27, 2014 8:12 PM | 10.1.1.126 | Closed | Low | | |
| IR-7 | SLC | Data Loss | June 20, 2014 10:09 PM | 10.1.2.56 | Closed | Moderate | | |
| IR-8 | TSC | Data Loss | June 4, 2014 11:59 AM | 10.1.1.216 | New | High | | |
| IR-9 | NYC | Malware | June 21, 2014 1:44 AM | 10.1.2.138 | New | None | | |
| IR-10 | BOS | Data Loss | April 13, 2014 1:12 AM | 10.1.1.193 | Pending | Low | | |
| IR-11 | NYC | Data Loss | May 7, 2014 12:08 PM | 10.1.3.107 | New | Low | | |
| IR-12 | MIA | Data Loss | April 29, 2014 3:59 PM | 10.1.3.26 | New | Moderate | | |
| IR-13 | CLE | Malware | June 16, 2014 8:16 AM | 10.1.2.142 | Pending | High | | |
| IR-14 | PHI | Data Loss | May 25, 2014 11:54 AM | 10.1.3.68 | Pending | High | | |
| IR-15 | MIA | Data Loss | May 13, 2014 11:59 AM | 10.1.2.185 | In Progress | Moderate | | |
| IR-16 | KAN | Vulnerable | May 24, 2014 6:28 AM | 10.1.1.249 | In Progress | Low | | |
| IR-17 | CHI | Data Loss | April 21, 2014 2:29 PM | 10.1.3.80 | Closed | None | | |
| IR-18 | NOL | Threat Intel | April 11, 2014 4:04 PM | 10.1.3.112 | Closed | Low | | |
| IR-19 | NYC | Data Loss | May 2, 2014 1:19 AM | 10.1.3.78 | In Progress | High | | |
| IR-20 | TSC | Phishing | April 30, 2014 9:54 AM | 10.1.1.14 | Pending | Moderate | | |
| IR-21 | SLC | Phishing | April 22, 2014 1:14 AM | 10.1.2.38 | In Progress | High | | |
| IR-22 | NOL | Phishing | April 21, 2014 3:16 AM | 10.1.2.137 | Closed | High | | |
| IR-23 | HO | Data Loss | June 28, 2014 4:29 PM | 10.1.1.10 | In Progress | High | | |

IR-4                                                                 + New Record  🗑 Delete :

General Information — 402

Alert Source: — 404
[Email ▸ ✕]

Alert Type: — 406
[Data Loss ▸ ✕]

Location:
[✕ OMA  ✕ SLC  ✕ MIA ▸]

Assigned To:
[Bret Stams ▸ ✕]

Escalation:
[▸]

Alert Detected By:
3rd Party [▸ ✕]

Alert Date and Time:
05-08-2014 📅   12:39 AM 🕐

Severity:
Medium [▸ ✕]

Shift:
Night [▸ ✕]

False Positive Validation:
No [▸]

Associated Cases                                                New | Lookup Alert IP Source    Alert Detected By    Assigned To     Alert Triage Status
10.1.1.21          3rd Party            Molly Franco    In Progress
                                        🔒

Alert Information

Alert Destination Host:                 Alert IP Source:
crm01.acme.com                          10.11.213

Alert Destination IP:                   Alert Source Host:
192.168.1.2                             1107usrpho Alert Source Email:
                                        marketing@acme.com 2 Threat(s) Found 3 months ago:  Visualize — 408

FIG. 4

THREAT RESPONSE SYSTEMS AND METHODS

FIELD

The present disclosure relates to systems and methods for fully or partially automated security threat response.

BACKGROUND

Entities around the world rely on technology to store sensitive data and conduct business operations. These same entities are constantly under the threat of cyber attacks that threaten to undermine the security of their critical technologies. As the frequency and severity of cyber attacks continue to rise, organizations often find themselves undermanned to respond to each attack. Attacks come frequently and in many forms. A single organization may identify, for example, hundreds of thousands of potential threat notifications a day each resulting in an alarm and/or a potential incident. A dedicated security analyst may only have the time to address a handful. As a result, millions of threats may go unresolved and/or unseen in a day, week or month. The volume of incidents that result from these threats may be so prohibitive that adding analysts barely scratches the surface of the unviewed incidents.

In addition to the sheer volume of threats facing organizations with an online presence, the variation in the types and origins of the threats grows and changes daily. No one individual can keep up with the myriad of techniques and origins that attackers may use against an organization. There are threat databases and intelligence gathering services available; however, these services may not integrate new intelligence effectively into existing security operations and incident response solutions.

To compound the difficulties in current incident response approaches, each organization is different. The organizational structure differs, the vulnerabilities differ, and thus the threats facing each organization naturally differ. For example, a hospital may house sensitive patient care information and interface with the outside world through limited web interfaces, while a bank may house financial information that motivates constant attacks. No one-sized solution fits the demands of every organization.

SUMMARY

A system, method, and computer readable medium (collectively, the "system") is disclosed for responding to security threats. The system may receive an alarm or notification in response to a threat detected on a monitored system or an aggregate of events event correlated to be determined to be an alarm. The alarm may include characteristics of the threat. The system may then generate a record in response to the alarm and populate a form with the characteristics of the threat. The form may be associated with the record and selected in response to the type of the threat. The system may further generate a workflow including at least one action. The system also receives additional security contextual detail in response to a request including the characteristics of the threat and then updates the form to include the additional contextual detail. Additionally, the record can be cyclically evaluated for current data was well as additional data to continue the inquiry for additional contextual data or action execution.

In various embodiments, the system may be leveraged to generate the forms using a drag-and-drop interface to create fields. The characteristics of the threat may include an origination IP address, a target IP address, a severity score, a suggested action, and/or the threat type. The system may leverage various workflow options in response to the form content including aggregated security contextual data. A step of the workflow may be completed automatically according to a workflow condition, and the record may be closed automatically in response to completing the step of the workflow. The step may include sending a notification, requesting a second threat intelligence, submitting a second threat intelligence, and/or modifying the form. The system may also update the configuration settings of third party system, such as web proxies and/or firewalls, in response to receiving security alert or contextual information, wherein the rule alters the behavior of a monitored system.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 3 illustrates an exemplary list of collected threats and notifications corresponding to alarms in a grid view for tracking the status of the tickets, in accordance with various embodiments;

FIG. 4 illustrates an exemplary form containing details of a ticket containing characteristics of an alarm, notification and/or threat intelligence, in accordance with various embodiments;

DETAILED DESCRIPTION

Figure 1:
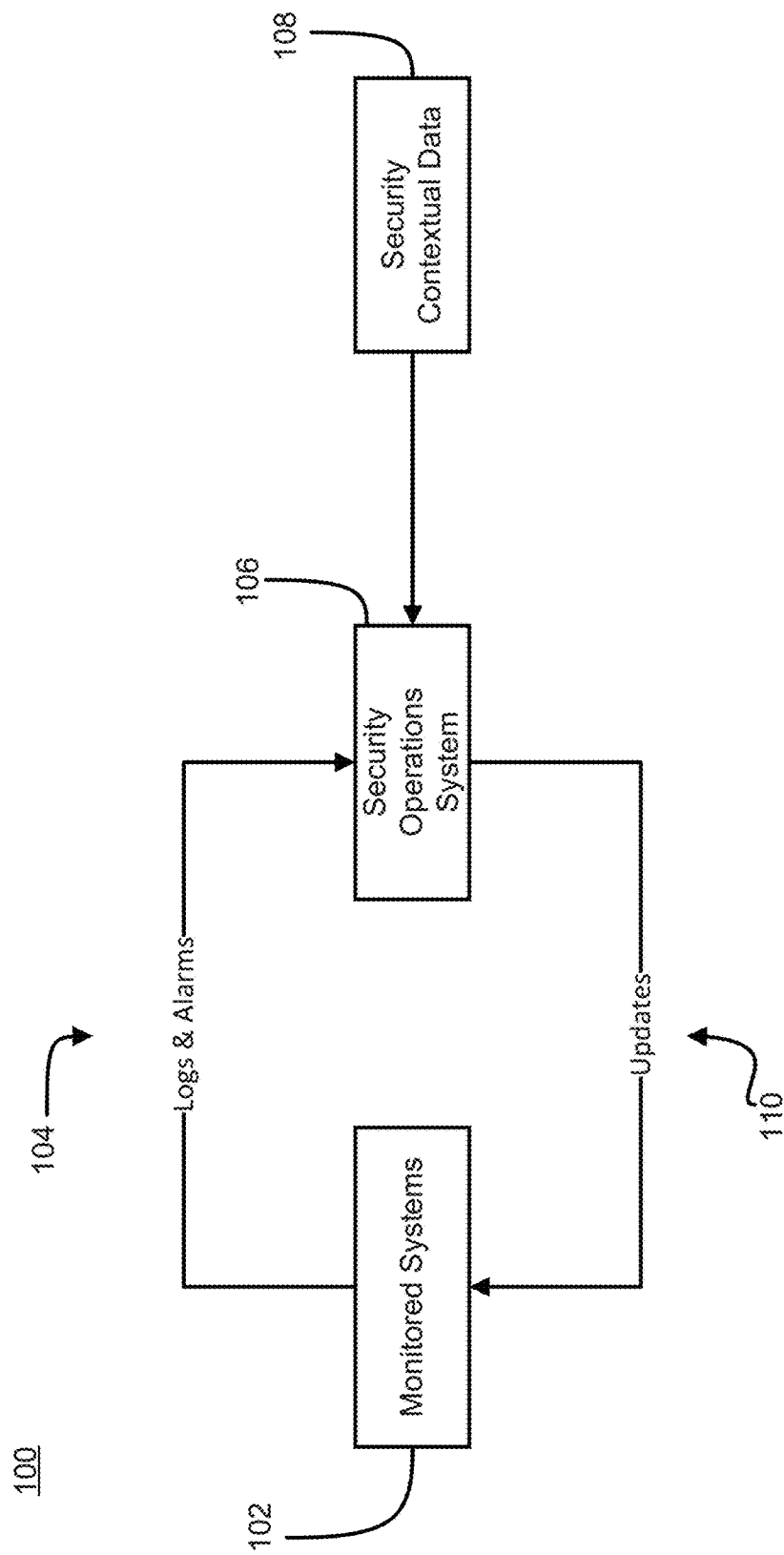
FIG. 1 illustrates an exemplary security operations environment with monitored systems, alarm and notifications sources presenting potential threats by generating alarms for a security management device, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Systems and methods disclosed herein may fully or partially automate response to security threats by generating records and populating forms associated with the records using a feedback loop to advance the records towards completion. As used herein, the term "record" may be used to describe a collection of data associated with a security threat or incident. The term "record" may be used interchangeably with similar terms such as "ticket," "case," or "entry."

Forms are customizable and thus adaptable to varying needs for entities facing varying threats. Workflows detailing the steps and actions to take in response to identified threats are based on the customizable form and are themselves customizable by adding, removing, and modifying the rules that generate the steps and actions. The system may be leveraged to further model additional responses to newly encountered threats and automate a threat response when the same threat is identified in the future. An automated threat response may increase the number of threats that are addressed by completing and closing records for responses the system can resolve without user support. Threats that may not be resolved without user support can be prepared for user input by populating forms and workflows and completing steps and actions until a stopping point is reached.

With reference to FIG. 1, security operations environment 100 is shown according to various embodiments. Security operations environment 100 includes monitored systems 102 that may be subject to attack. Monitored systems 102 may include the hardware and software that provide and/or monitor email services, web services, firewalls, networks, servers, file systems, sensitive information (e.g., personally identifying information), telephone systems, web proxies, antivirus systems, intrusion detection systems (IDS), or any other security detection system or potential attack target. Monitored systems 102 may generate and communicate logs and alarms 104 for security operations system 106 via a network (e.g., a local area network, a wide area network, and/or the Internet). Logs and alarms 104 may also include data, security, and/or notifications sent to security operations system 106. Logs and/or alarms 104 may identify security threats and provide information associated with the security threat that was captured by monitored systems 102. Security threats may include, but are not limited to, data loss, denial of service (DoS), malware, viruses, violations of user policy, activity from known bad IP addresses, system failures, or other detectable incidents and failures that may merit further investigation.

In various embodiments, security operations system 106 may respond to the logs and alarms 104 by generating tickets where appropriate. Security operations system 106 may generate tickets using conditions that are evaluated on the initial security threat as well as other characteristics that are gathered based on the initial security threat.

For example, an alarm may signal a data loss security threat that was targeting personally identifying information (PII). Security operations system 106 may have a condition stating if a data loss threat is detected targeting a system containing PII then generate a ticket and set the ticket status to high level threat. Thus, security operations system 106 may automatically generate the ticket and set the threat level to high. As discussed in further detail below, rules may thus be used by security operations system 106 to populate forms, submit threat intelligence, request security contextual data, execute workflows, alter configurations in external systems, and otherwise automate threat response.

In various embodiments, security operations system 106 may receive threat intelligence related to security threats. Threat intelligence may include characteristics of attacks that have been detected in the past and may be relevant to security operations system 106. Threat intelligence may include IP addresses, email addresses, domains, file hashes or other observable threat elements related to known attacks, and their related characteristics, or other details that may assist security operations system 106 in generating configuration changes for improved or alter protection for monitored systems 102 or otherwise automating threat response. Updates 110 may be configuration, signature or ruleset updates or system updates for monitored systems 102. Updates 110 to monitored systems or protection solutions may include blocking IP addresses, preventing file execution, block access to domains, prevent mail from particular email addresses, or other sources of threats. For example, threat intelligence 108 may provide a domain associated with malware attacks. For example, security operations system 106 may generate a new ruleset or configuration on protection systems such as web proxies, firewalls, or intrusion prevention systems (i.e., monitored systems 102) that prevents any machine from executing an identified action or visiting a web site on the identified domain. Updates 110 to the configurations and rulesets of monitored systems may result in further alarms as attacks matching the new configurations and rulesets are detected. In that regard, updates 110 to monitored systems 102 allow security operations system 106 to self-learn and enhance security without user input.

Figure 2:
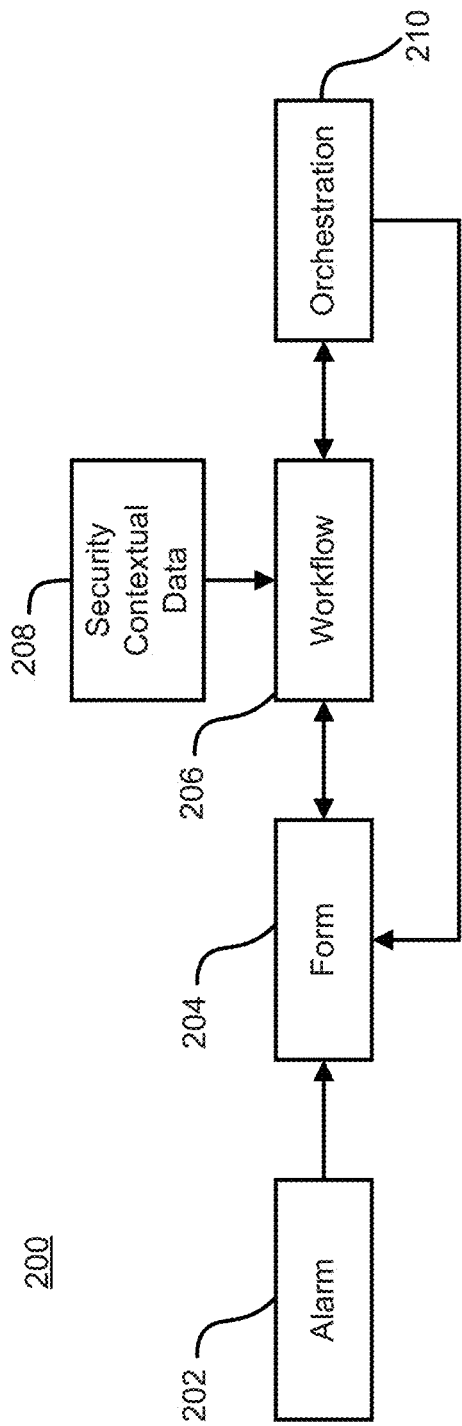
FIG. 2 illustrates an exemplary flow chart for fully or partially automating responses to alarms and integrating threat intelligence, in accordance with various embodiments.

With reference to FIG. 2, a flow chart 200 for security operations system 106 of FIG. 1 is shown, in accordance with various embodiments. Security operations system 106 may receive an alarm 202 as disclosed above with reference to FIG. 1. The alarm may include accompanying security threat characteristics for use in generating a ticket. With brief reference to FIG. 3, an exemplary list 300 of records 318 is shown in a grid view. Records 318 may also be referred to as cases, tickets, and/or entries and may act as the access point for information and workflows associated with an alarm.

As used herein, security operations system 106 may refer to one or more computing devices capable of supporting the forms, workflows, and records described herein. In that regard, security operations system 106 may include one or more of the following: a host server or other computing systems including a processor for processing digital data; a memory coupled to the processor for storing digital data; an application program stored in the memory and accessible by the processor for directing processing of digital data by the processor; a display device coupled to the processor and memory for displaying information derived from digital data processed by the processor; and/or databases. For, example and without limitation, a security operations system 106 may include one or more of the following: smartphone, PDA, laptop, desktop computer, a server, a computing cluster, a distributed file system, or any other devices.

In various embodiments, the records, forms, and workflows described herein may be stored by security operations system 106 using databases or database-like storage systems. Databases for storing the features described herein may include document-oriented databases; NoSQL databases, relational databases, XML files, JSON files, or other storage structures. In various embodiments, the records, forms, and workflows described herein may comprise data stored in document based database.

As depicted in FIG. 3, a record 318 may include various details regarding an alarm. For example, record 318 may include various fields such as a record ID 302, for example. Record ID 302 may be a unique identifier assigned to a record 318. Record 318 may also include a location 304 and alert type 306. The location may be the location of the resource under threat that caused the alarm. Multiple locations may be implicated by a single alarm. A location may include a geographical indicator such as, for example, compete or abbreviated city names, state names, office locations, site codes, or other suitable indicators of location. Alert type 306 may include a type of threat such as data loss, denial of service (DoS), malware, viruses, violations of user policy, etc. Record 318 may also include time 308 of the alarm, alert IP source 310 from which the alert originated, and an alert status 312 indicating whether the record is closed, new, pending, in progress, or in another state. Alert status 312 may also indicate a department or individual processing the record such as "Pending—HR," "Pending—Privacy Office," "In process—Forensics," etc.

In various embodiments, each record may include an alert severity 314 to indicate the degree of severity, perceived risk, or urgency, and to whom the record should be shared or assigned. Alert severity 314 may indicate that a record is red (highly sensitive), amber (moderately sensitive), green (minimally sensitive), or white (not sensitive). Alert severity 314 may be omitted or replaced with another scale for sensitivity as appropriate in various embodiments. Record 318 may also include an alert destination 316 to identify the potentially target host or destination of external communication. The fields of record 318 available in list 300 may be customized with fields being added, removed, or modified for various embodiments. For example, list 300 may include additional fields 320 such as host names, domains, IP addresses, email accounts, or other data related to a record 318. Fields may be selectively added or removed based on the desired data to be retained in records 318.

With reference to FIGS. 2 and 4, an exemplary form 400 associated with a record is shown, in accordance with various embodiments. Form 400 may be associated with a record indicated in record ID field 402. Form 400 may include sections 404. Sections 404 may be named and organized for varying applications. For example, form 400 as illustrated includes sections 404, which include general information, alert information, and the subsection associated cases. Each section comprises one or more fields 406. The fields 406 illustrated in section 404 for general information include alert source, alert type, location, assigned to, escalation, alert detected by, alert date and time, alert severity, shift, and false positive validation. Form 400 also allows for manual record creation and record deletion using interface 410. Form 400 may also provide access to other views related to the record by way of navigation interface 408. The fields 406 and sections 404 illustrated in form 400 are included for illustrative purposes and may vary for different embodiments.

Figure 5:
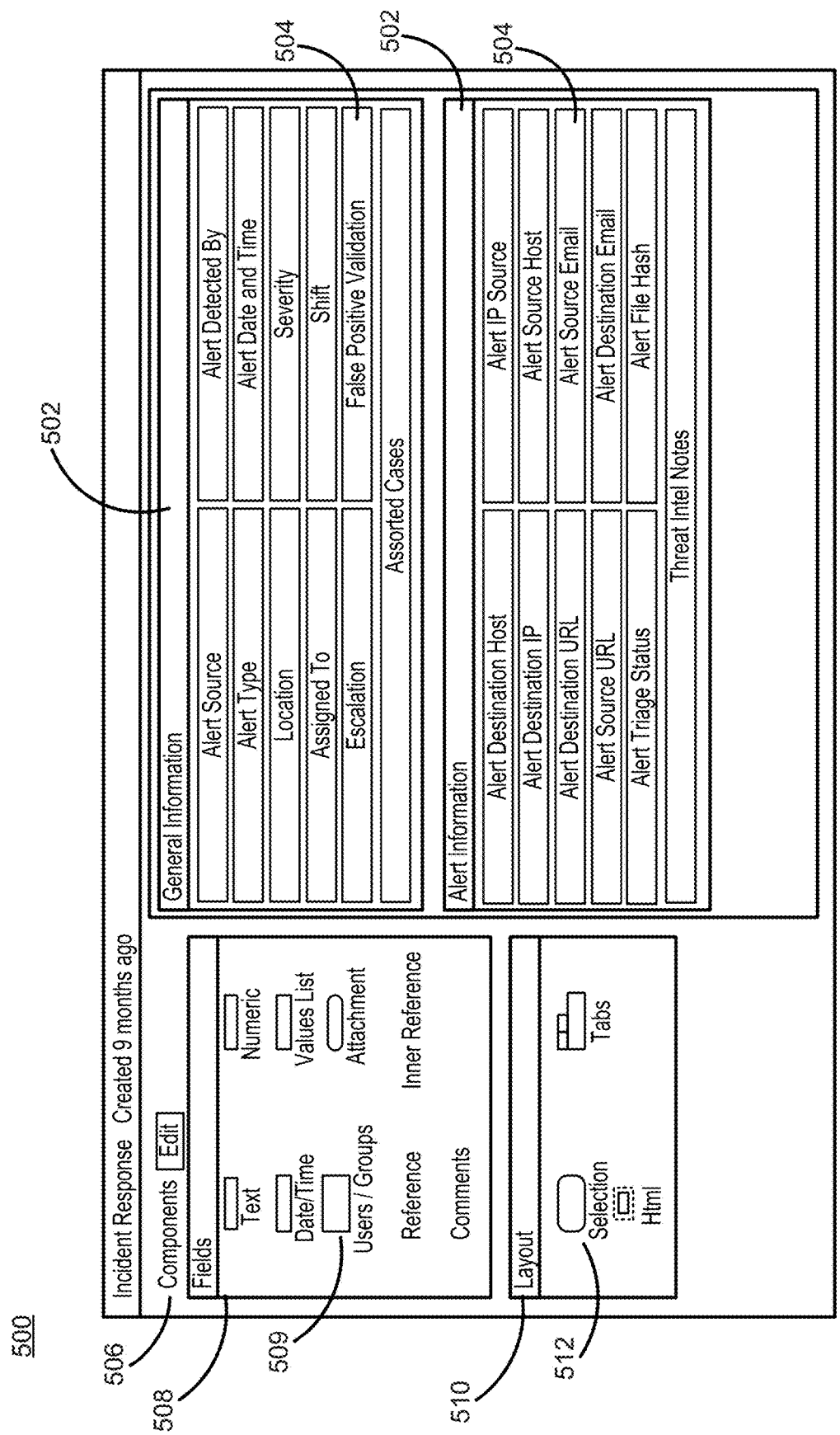
FIG. 5 illustrates an exemplary form customization screen for modifying the format of a form using a drag-and-drop interface to alter fields and sections available on the form, in accordance with various embodiments.

In various embodiments, and with reference to FIGS. 4 and 5, a form interface 500 for modifying a form 400 is shown, in accordance with various embodiments. Form interface 500 may include tabs for displaying various components 506 that can be added, modified, specified, deleted, and/or moved on form 400. Components 506 may include fields 508. Fields 508 may come in various field types 509 including free text, numeric, data/time, value lists, users, groups, attachments, references, internal references, and/or comments, for example. Each type of field type 509 may have certain characteristics to enforce the type of data that may be entered in the field. For example, a numeric field appearing on form 400 may only accept numbers, while a values list may only accept a value selected from a predetermined list of values. Field types 509 may thus provide simple data type validation by enforcing the type of data accepted in a corresponding field 406 in form 400.

In various embodiments, sections 502 may be added using layout components 510. Layout components 510 may include various layout components 512 such as sections, tabs, and HTML components, for example. Sections and tabs may be simple drag and drop features while HTML components may enable custom encoding for fields. In that regard, sections 502 may be created by dragging and dropping layout components 512 into customization region 514. Similarly, fields may be created by dragging and dropping field types into layout components 512 in customization region 514. Each field 504 created in section 502 may have the characteristics associated with the corresponding field type 509 used to create field 504. The sections 502 and fields 504 appearing in form interface 500 correspond to sections 404 and fields 406 of form 400.

For example, section 502 for general information may be created by dragging and dropping a layout component 512 for a section from layout components 510 to customization region 514. The title general information may then be entered. Field 504 for alert source may then be created by dragging and dropping a values list field type 509 from fields 508 into the newly created layout component 512 for general information in customization region 514. The values for the value list of field 504 may then be specified along with the title. Form interface 500 may start from a template with default sections 502 and fields 504 in place in customization region 514, or may be generated from scratch using the above described techniques. In that regard, form 400 may be customized using form interface 500 to include specified sections 404 and fields 406.

Figure 6:
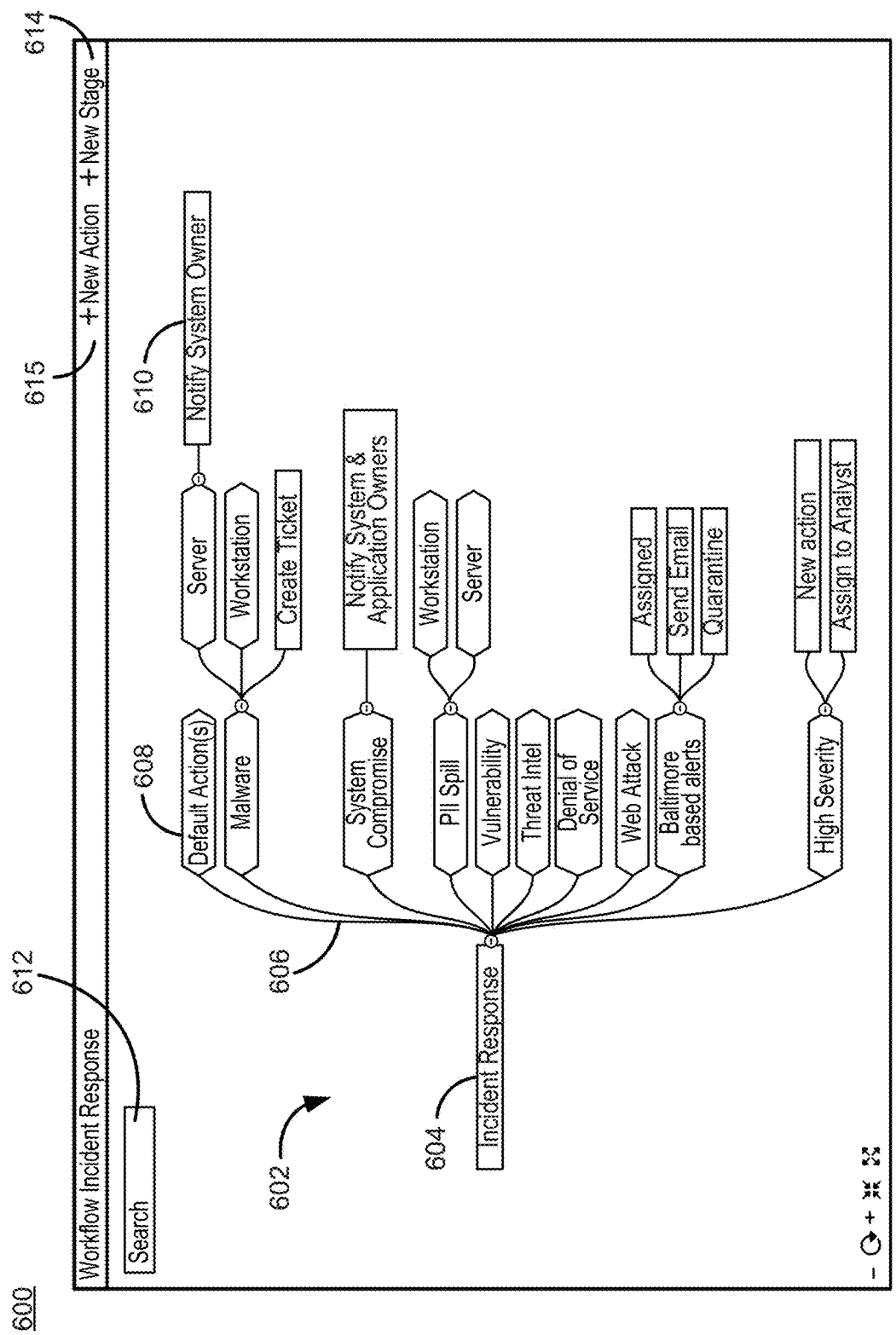
FIG. 6 illustrates an exemplary work flow generated in response to an alarm with steps and actions corresponding to fields in a form, in accordance with various embodiments.

Referring to FIG. 2, form 204 may be used by security operations system 106 to execute a workflow 206. In executing workflow 206, security operations system 106 may automatically update form 204. Referring now to FIGS. 6 and 4, an exemplary workflow 602 is shown in workflow interface 600. Workflow 602 may include stages 608 and actions 610 to be taken in response to form 400. Form 400 of FIG. 4 may also correspond to starting point 604 of workflow 602. Starting point 604 may have links 606 between the various stages 608 and actions 610 of workflow 602. Workflow 602 may enable security operations system 106 to act by sending notifications, collecting security contextual data, submitting threat intelligence, altering form layout and contents, populating fields in form 400, opening records, closing records, and/or otherwise following the rules of workflow 602 to automatically complete steps and take actions in a predetermined manner.

In various embodiments, workflow 602 may be generated by adding stages 608 and actions 610 using new stage interface 614 and new action interface 615, respectively. Each stage may contain logic (i.e., rules) for evaluating the fields predefined by a corresponding form. A menu may be accessed for each stage 608 and/or action 610. The menu for a stage 608 may comprise a stage name. The stage name may be an identifier for stage 608 in workflow 602, such as "Default Action(s)." The stage name may allow differentiation between stages and searching based on stage name using search interface 612.

In various embodiments, a stage 608 may also comprise a field selection, an evaluation, and a value to enable logical evaluations of the fields 406 in form 400. A field selection may include the name of an available field 406 in form 400. For example, as illustrated in FIG. 4, a field selection may be "Alert Source," "Alert Type," or "Location." The value of the selected field may then be evaluated using an evaluation function. Evaluation functions may include logical operators such as equals, not equals, less than, greater than, for example. An evaluation function may be selected, and then a value may be selected and/or entered in free form. For example, the field selection may be "Alert Type," the evaluation function may be "equals," and the value may be "Data Loss." Continuing the example, the form 400 of FIG. 4 meets the criteria by evaluating to a logical truth and the security operations system 106 may automatically complete the stage 608 without further input. After completion, security operations system 106 may move to the next stage 608 or action 610. Stages 608 may comprise one or more logical evaluation rules for one or more fields 406.

In various embodiments, workflow 602 may also comprise actions 610 to be carried out by security operations system 106. Action 610 may comprise an action name similar to a stage name. An action may also include an action type. Action types are the various types of actions security operations system 106 can take. For example, action types can include set field value, email notification, sms notification, close record, set field to read/write, set field to optional/required, filter values, and show/hide fields and sections. For example, an action name may be "Assign to Analyst." Action 610 may include an action with an action type "set field value," a field "Assigned to," and a value "Anne Analyst." Action 610 may thus set the value of field 406 entitled "assigned to" to "Anne Analyst." An action 610 may comprise one or more actions to be taken on one or more fields of form 400.

In various embodiments, workflow 602 may be generated by adding stages 608 and actions 610 that guide security operations system 106 in responding to future alarms. As the workflow 602 is expanded to automate address alarms with greater detail, the security operations system 106 may automatically follow workflow 602 to competition and close records without analyst input. The workflow 602 may also be configured to have security operations system 106 collect information in form 400 for an analyst to view and take action on in response to an alarm that security operations system may not handle completely autonomously.

Returning to FIGS. 1 and 2, security operations system 106 may complete steps and actions of workflow 206 for which information is available and begin orchestration 210. During orchestration, security operations system 106 may query for, submit, and/or retrieve security contextual data 208. Security operations system 106 may also query local assets such as data files, databases, and logs to extract information for comparison and/or addition into forms. Security contextual data 208 may originate from third party vendors, similarly situated companies, or other repositories and may include threat data such as attack types, IP addresses, domains, email addresses, related attacks, related characteristics, and/or other characteristics associated with threats.

In various embodiments, security operations system 106 may use threat intelligence or other security contextual data to modify, update, populate, or create forms such as form 400 of FIG. 4. In that regard, security operations system 106 may automatically integrate security contextual data 208 derived from attacks made on entities outside the domain of security operations system 106. Security operations system 106 may also use threat intelligence to gather data for user review, update rulesets and configurations on monitored systems 102, or take other actions in response to the information ingested by security operations system 106. A workflow similar to workflow 602 of FIG. 6 may be generated with steps and actions for security operations system 106 to execute when communicating with threat intelligence or other security contextual data 208. The security operations system can leverage data gathered at ingestion or through orchestration actions that enrich the record, providing an improved, holistic dataset from which to operate. The data collected in this process can be leveraged to enable configuration changes to enable the response to threats or implemented modified or improved rulesets and configurations on monitored system. Configuration changes may be implemented in various methods not limited to the execution of customized actions based on holistic data. These actions include but are not limited to the execution of scripts, interacting (pull/get) from Application Programming Interfaces (APIs), interacting with databases or executing command-line executables and commands.

Figure 7:
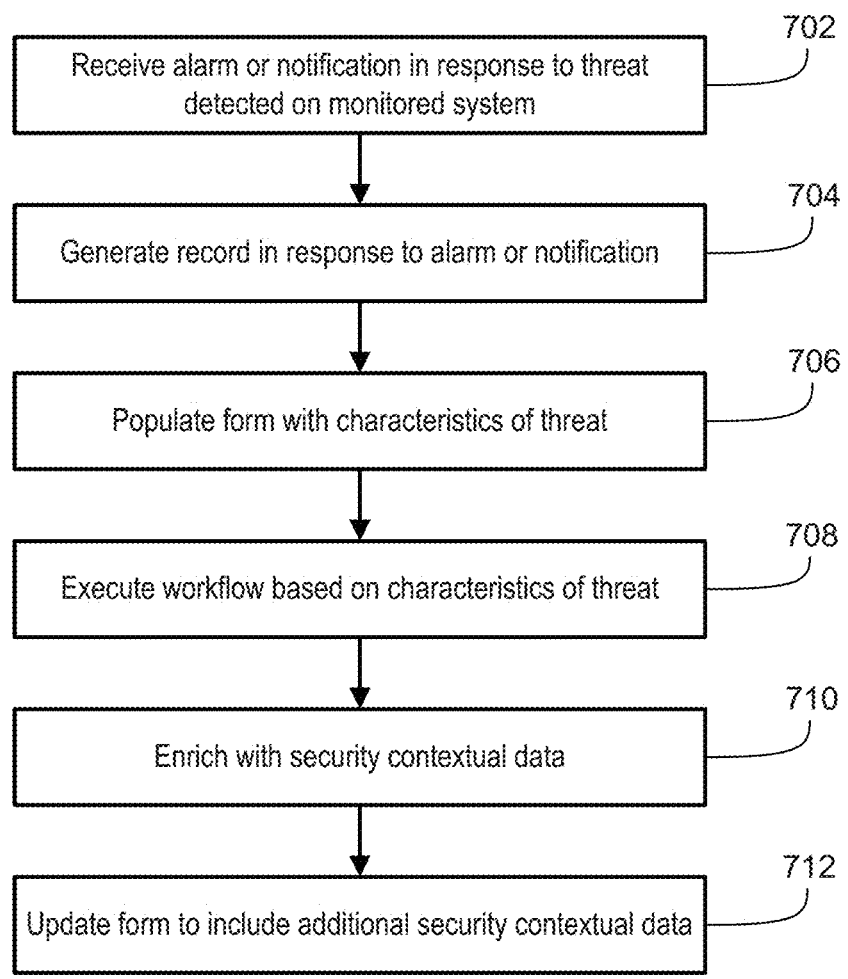
FIG. 7 illustrates an exemplary process for use by a security operations system in responding to threats, in accordance with various embodiments.

With reference to FIG. 7, process 700 for responding to threats is shown, in accordance with various embodiments. Process 700 may be executed by security operations system 106 in response to an alarm. Security operations system 106 may receive an alarm and/or notification in response to a monitored system detecting a threat (Block 702). The alarm may include characteristics of the threat as disclosed above. The alarm may indicate that an attack or a threat has been discovered. Security operations system 106 may then generate a record in response to the alarm and/or notification (Block 704). The record may be similar to record 218 disclosed above. Security operations system 106 may also populate a form with the characteristics of the threat (Block 706). The form may be associated with the record and selected in response to a type of the threat. The form may serve as a repository for data associated with a record, such as threat characteristics. The form may also be stored in a database, as disclosed above.

In various embodiments, security operations system 106 may also execute a workflow based on the characteristics of the threat (Block 708). The workflow may be associated with the form and executed by considering the values of fields in the form. The workflow may include the rules that security operations system 106 follows for data evaluation and actions that security operations system 106 takes in response to predetermined conditions being met. For example, a workflow may include actions and steps as described above with reference to workflow 602 of FIG. 6. Security operations system 106 may also enrich forms and/or workflows with security contextual data (Block 710). The threat intelligence or other security context data may be transmitted to security operations system 106 by, for example, a third party threat intelligence provider. Security operations system 106 may request the security contextual data by submitting selected characteristics of the threat for matching with threat intelligence data. Security operations system 106 may also update the form to include additional security contextual data in response to receiving security contextual data (Block 712).

The systems described herein may enable automated response to a variety of security threats. Security operations systems may automatically populate forms with data corresponding to a threat and/or execute steps and actions in a workflow associated with the form. The steps may be conducted in a loop so that security operations systems can add data from the workflow processing and security contextual data, including threat intelligence into the form and re-execute the workflow processing and threat intelligence based on the updated data within the form. In many instances, such as with previously encountered low severity threats, the security operations system may analyze threats and close the corresponding records without interaction from a user. Thus, security operations systems disclosed herein may enable the assessment and closing of numerous threats, cases, tickets or records in a day, thereby reducing the number of threats that go without review. Furthermore, the system may dynamically adjust threat severity and reassign records based on information developed during the workflow and orchestration processes.

What is claimed is:

1. A method for incident response, comprising:
    receiving, by a security operations system, an alarm in response to a threat detected on a monitored system, wherein the alarm includes characteristics of the threat;
    generating, by the security operations system, a record in response to the alarm, wherein the record includes a severity level assigned to the record, wherein the severity level is automatically generated based on a threat level identified in the alarm;
    populating, by the security operations system, a form with the characteristics of the threat, wherein the form is associated with the record and selected in response to a type of the threat;
    generating, by the security operations system, a workflow, wherein the workflow is customizable, by at least one of adding, removing, or modifying a rule for an action, prior to the security operations system receiving the alarm, wherein the workflow is configured to be automatically executed to address the alarm, and wherein the workflow comprises a first action;
    automatically executing, by the security operations system, the first action of the workflow;
    receiving, by the security operations system, security contextual data in response to a request including the characteristics of the threat;
    updating, by the security operations system, the form to include the security contextual data;
    enriching, by the security operations system, the workflow to generate a second action; and
    automatically executing, by the security operations system, the second action of the workflow.

2. The method of claim 1, further comprising generating, by the security operations system, the form using a drag-and-drop interface to create fields, wherein the form is customizable.

3. The method of claim 1, wherein the characteristics of the threat include at least one of an origination IP address, a target IP address, a severity score, a suggested action, the type of the threat, threat information, or vulnerability information.

4. The method of claim 1, further comprising closing, by the security operations system, the record automatically in response to completing the second action of the workflow, wherein the record is customizable.

5. The method of claim 1, wherein the first action comprises at least one of sending a notification, requesting a threat intelligence, submitting the threat intelligence, modifying the form, or modifying system configurations.

6. The method of claim 1, further comprising updating, by the security operations system, a configuration in response to the receiving the security contextual data, wherein the configuration alters a behavior of the monitored system.

7. The method of claim 6, wherein the updating the configuration comprises altering at least one of an execution of scripts, an application programming interface (API) interaction, a database interaction, or a command-line executable or command in the monitored system.

8. The method of claim 1, wherein the automatically executing the first action comprises at least one of automatically sending an email notification, sending an SMS notification, closing the record, setting a field to read/write, setting the field to optional/required, filtering values, showing the field or a section, hiding the field or the section, or connecting to a third-party system to gather data based on the alarm.

9. The method of claim 8, wherein the automatically executing the second action comprises at least one of automatically sending the email notification, sending the SMS notification, closing the record, setting the field to read/write, setting the field to optional/required, filtering values, showing the field or the section, hiding the field or the section, or connecting to the third-party system to gather data based on the alarm.

10. The method of claim 1, wherein the security contextual data comprises at least one of an attack type, an IP address, a domain, an email address, a related attack, or a related characteristic.

11. The method of claim 1, wherein the security contextual data is received from a third party threat intelligence provider based on the characteristics of the threat.

12. A computer-based system, comprising:
    a processor; a tangible, non-transitory memory configured to communicate with the processor, the tangible, non-transitory memory having instructions stored thereon that, in response to execution by the processor, cause a security operations system to perform operations comprising:
    receiving, by the security operations system, an alarm in response to a threat detected on a monitored system, wherein the alarm includes characteristics of the threat;
    generating, by the security operations system, a record in response to the alarm, wherein the record includes a severity level assigned to the record, wherein the severity level is automatically generated based on a threat level identified in the alarm;
populating, by the security operations system, a form with the characteristics of the threat, wherein the form is associated with the record and selected in response to a type of the threat;
generating, by the security operations system, a workflow, wherein the workflow is customizable, by at least one of adding, removing, or modifying a rule for an action, prior to the security operations system receiving the alarm, wherein the workflow is configured to be automatically executed to address the alarm, and wherein the workflow comprises a first action;
automatically executing, by the security operations system, the first action of the workflow;
receiving, by the security operations system, a security contextual information in response to a request including the characteristics of the threat;
updating, by the security operations system, the form to include the security contextual information;
enriching, by the security operations system, the workflow to generate a second action; and
automatically executing, by the security operations system, the second action of the workflow.

13. The computer-based system of claim 12, further comprising generating, by the security operations system, the form using a drag-and-drop interface to create at least one of fields, naming conventions, or layouts, wherein the form is customizable.

14. The computer-based system of claim 12, wherein the characteristics of the threat include at least one of an origination IP address, a target IP address, a severity score, a suggested action, the type of the threat, threat information, or vulnerability information.

15. The computer-based system of claim 12, further comprising closing, by the security operations system, the record automatically in response to completing the second action of the workflow, wherein the record is customizable.

16. The computer-based system of claim 12, wherein the first action comprises at least one of sending a notification, requesting a second threat intelligence, submitting the second threat intelligence, or modifying the form.

17. The computer-based system of claim 12, further comprising updating, by the security operations system, a configuration in response to receiving the security contextual information, wherein the configuration alters a behavior of the monitored system.

18. An article of manufacture including a non-transitory, tangible computer readable storage medium having instructions stored thereon that, in response to execution by a security operations system, cause the security operations system to perform operations comprising:
receiving, by the security operations system, an alarm in response to a threat detected on a monitored system, wherein the alarm includes characteristics of the threat;
generating, by the security operations system, a record in response to the alarm, wherein the record includes a severity level assigned to the record, wherein the severity level is automatically generated based on a threat level identified in the alarm;
populating, by the security operations system, a form with the characteristics of the threat, wherein the form is associated with the record and selected in response to a type of the threat;
generating, by the security operations system, a workflow, wherein the workflow is customizable, by at least one of adding, removing, or modifying a rule for an action, prior to the security operations system receiving the alarm, wherein the workflow is configured to be automatically executed to address the alarm, and wherein the workflow comprises a first action;
automatically executing, by the security operations system, the first action of the workflow;
receiving, by the security operations system, security contextual data in response to a request including the characteristics of the threat;
updating, by the security operations system, the form to include the security contextual data, enriching, by the security operations system, the workflow to generate a second action; and
automatically executing, by the security operations system, the second action of the workflow.

19. The article of claim 18, further comprising generating, by the security operations system, the form using input from a drag-and-drop interface to create fields, wherein the form is customizable.

20. The article of claim 18, wherein the characteristics of the threat include at least one of an origination IP address, a target IP address, a severity score, a suggested action, the type of the threat, threat information, or vulnerability information.

* * * * *